US011772485B2

(12) United States Patent
Matsubara et al.

(10) Patent No.: US 11,772,485 B2
(45) Date of Patent: Oct. 3, 2023

(54) ENGINE AND WORK MACHINE

(71) Applicant: HONDA MOTOR CO., LTD., Tokyo (JP)

(72) Inventors: Yasunori Matsubara, Saitama (JP); Ryota Morinaga, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 448 days.

(21) Appl. No.: 17/041,828

(22) PCT Filed: Mar. 30, 2018

(86) PCT No.: PCT/JP2018/013875
§ 371 (c)(1),
(2) Date: Sep. 25, 2020

(87) PCT Pub. No.: WO2019/187104
PCT Pub. Date: Oct. 3, 2019

(65) Prior Publication Data
US 2021/0023940 A1     Jan. 28, 2021

(51) Int. Cl.
*B60K 15/05*     (2006.01)
*F02M 35/02*     (2006.01)
(Continued)

(52) U.S. Cl.
CPC ......... *B60K 15/05* (2013.01); *F02M 35/0201* (2013.01); *A01D 2101/00* (2013.01); *B60K 2015/03217* (2013.01)

(58) Field of Classification Search
CPC ...... A01D 2101/00; B60K 2015/03361; B67D 3/0093; F02B 63/02; G01F 23/0007
See application file for complete search history.

(56) References Cited

U.S. PATENT DOCUMENTS 3,276,130 A * 10/1966 Vaughn ............... G01F 23/0007
                                                33/729
4,570,584 A *  2/1986 Uetsuji ................. F02B 75/007
                                               123/90.27
(Continued)

FOREIGN PATENT DOCUMENTS

GB      2285509 A  *  7/1995  ............. G01F 19/00
JP    S60-157329 A     10/1985
(Continued)

OTHER PUBLICATIONS

Jun. 19, 2018, International Search Report issued for related PCT application No. PCT/JP2018/013875.
(Continued)

*Primary Examiner* — Jonathan R Matthias
(74) *Attorney, Agent, or Firm* — Paratus Law Group, PLLC

(57) ABSTRACT

In an engine, an air cleaner and a muffler are located laterally opposite to each other with an engine body therebetween, the air cleaner and the muffler are located forward of the engine body in the longitudinal direction, a fuel tank is longer laterally than longitudinally when viewed from above and is located rearward of the engine body in the longitudinal direction, and an oil filler port which is sealed by a cap is provided to the fuel tank at a position laterally deviated leftward. A level gauge, which can be visually recognized when the cap is removed and the oil filler port is viewed from above and from the front side longitudinally, is provided inside the fuel tank.

6 Claims, 7 Drawing Sheets

(51) Int. Cl.
  *A01D 101/00* (2006.01)
  *B60K 15/03* (2006.01)

(56) References Cited

U.S. PATENT DOCUMENTS

| | | | | | |
|---|---|---|---|---|---|
| 5,000,126 | A | * | 3/1991 | Isaka | ............ F02B 75/16 |
| | | | | | 123/65 VD |
| 5,070,686 | A | * | 12/1991 | Isaka | ............ F01P 1/02 |
| | | | | | 123/41.58 |
| 2008/0022768 | A1 | * | 1/2008 | Bell | ............ G01F 23/02 |
| | | | | | 73/323 |
| 2009/0255333 | A1 | * | 10/2009 | Henry | ............ G01F 19/00 |
| | | | | | 73/426 |

FOREIGN PATENT DOCUMENTS

| | | |
|---|---|---|
| JP | H02-137506 A | 11/1990 |
| JP | H11-046514 A | 2/1999 |
| JP | 2000-139158 A | 5/2000 |
| JP | 2001-309710 A | 11/2001 |
| JP | 2016-124412 A | 7/2016 |

OTHER PUBLICATIONS

Jun. 19, 2018, International Search Opinion issued for related PCT application No. PCT/JP2018/013875.

* cited by examiner

ENGINE AND WORK MACHINE

CROSS REFERENCE TO PRIOR APPLICATION

This application is a National Stage Patent Application of PCT International Patent Application No. PCT/JP2018/013875 (filed on Mar. 30, 2018) under 35 U.S.C. §371, which is hereby incorporated by reference in its entirety.

TECHNICAL FIELD

The present invention relates to an engine and a work machine equipped with the engine.

BACKGROUND ART

In a work machine described in Patent Literature 1, a fuel tank is disposed rearward of an engine, and the fuel tank includes an oil filler port at a center portion in a left-right direction. In this type of work machine, when filling fuel into the fuel tank, a worker stands beside one side or the other side of the work machine in the left-right direction and performs the oil filling from a refueling tank to the fuel tank via the oil filler port.

CITATION LIST

Patent Literature

Patent Literature 1: JP-UM-H2-137506

SUMMARY OF INVENTION

Technical Problem

However, in the work machine described in Patent Literature 1, a distance from the oil filler port of the fuel tank to an end portion on the one side in the left-right direction is the same as a distance from the oil filler port of the fuel tank to an end portion on the other side in the left-right direction. Thus, even if the worker stands beside either one of the one side and the other side of the work machine, the distance from the worker to the oil filler port of the fuel tank becomes long and the oil filling is difficult to be performed. In general, when filling fuel to the fuel tank, the worker needs to be very careful so that the filled fuel does not overflow from the fuel tank.

The present invention provides an engine and a work machine in which oil filling can be performed easily and fuel can be prevented from overflowing from a fuel tank during the oil filling.

Solution to Problem

According to the present invention, there is provided an engine including:
an engine body;
a fuel tank;
an air cleaner; and
a muffler,
in which the air cleaner and the muffler are disposed on opposite sides in a first direction with the engine body interposed therebetween,
the air cleaner and the muffler are disposed on one side of the engine body in a second direction perpendicular to the first direction,
the fuel tank is longer in the first direction than in the second direction when viewed from above, and is disposed on the other side of the engine body in the second direction,
the fuel tank is provided with an oil filler port to be sealed with a cap at a position displaced to one side in the first direction, and
a level gauge, which can be visually recognized when the cap is removed and the oil filler port is viewed from above and from the one side in the second direction, is provided inside the fuel tank.

According to the present invention, there is further provided a work machine equipped with the engine,
in which a distance from the oil filler port of the fuel tank to an end portion on one side in the first direction is shorter than any distance of a distance from the oil filler port of the fuel tank to an end portion on the other side in the first direction, a distance from the oil filler port of the fuel tank to an end portion on one side in the second direction, and a distance from the oil filler port of the fuel tank to an end portion on the other side in the second direction.

According to the present invention, there is further provided a work machine equipped with the engine,
in which a distance from the oil filler port of the fuel tank to an end portion on one side in the first direction is shorter than a distance from the oil filler port of the fuel tank to an end portion on the other side in the first direction, and a distance from the oil filler port of the fuel tank to an end portion on one side in the second direction, and
a handle portion of the work machine is provided on the other side in the second direction relative to the oil filler port of the fuel tank.

Advantageous Effects of Invention

According to the present invention, it is possible to provide an engine and a work machine in which oil filling can be performed easily and fuel can be prevented from overflowing from a fuel tank during the oil filling.

DESCRIPTION OF EMBODIMENTS

Figure 1:
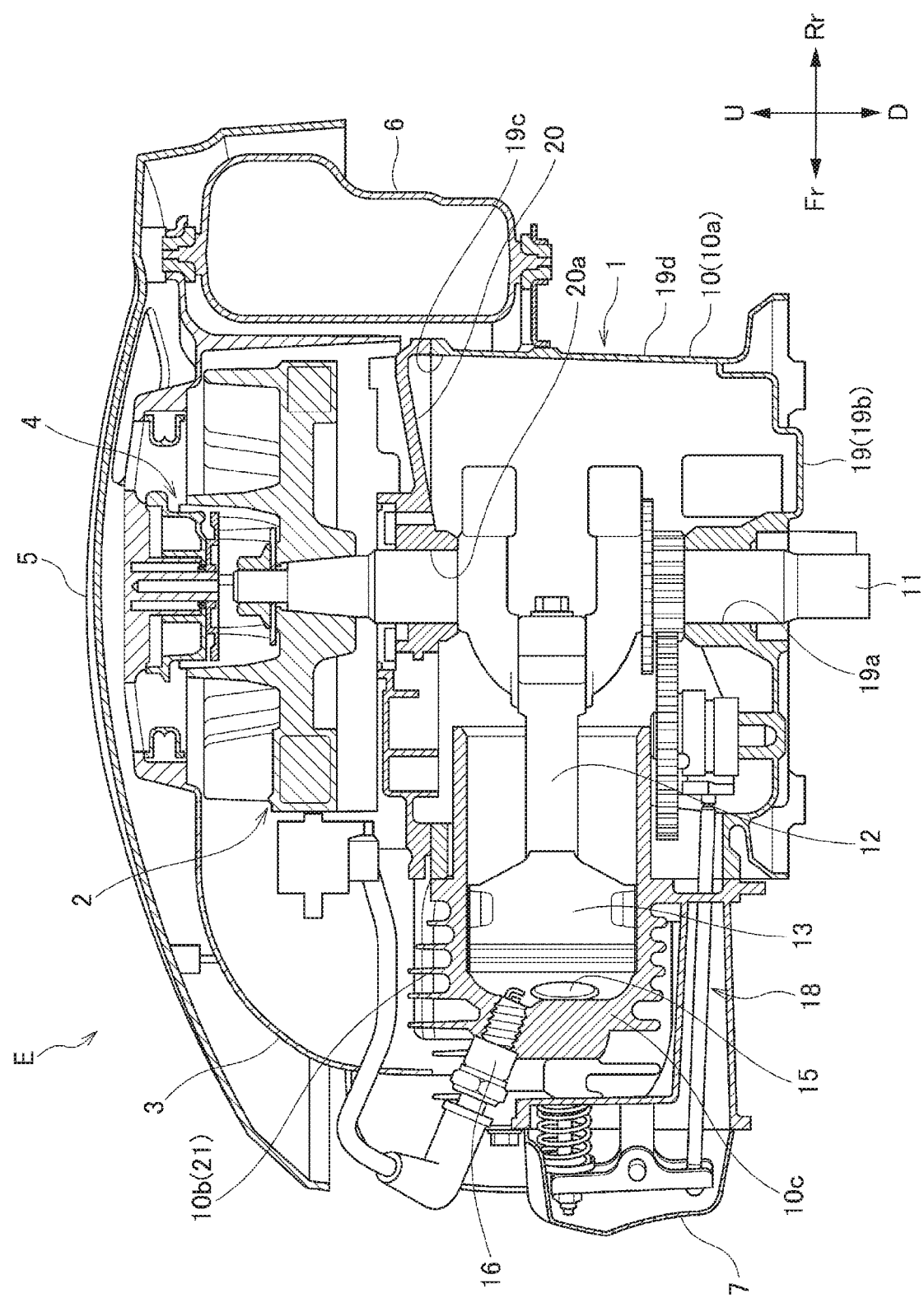
FIG. 1 is a cross-sectional view of an engine according to an embodiment of the present invention.
Figure 2:
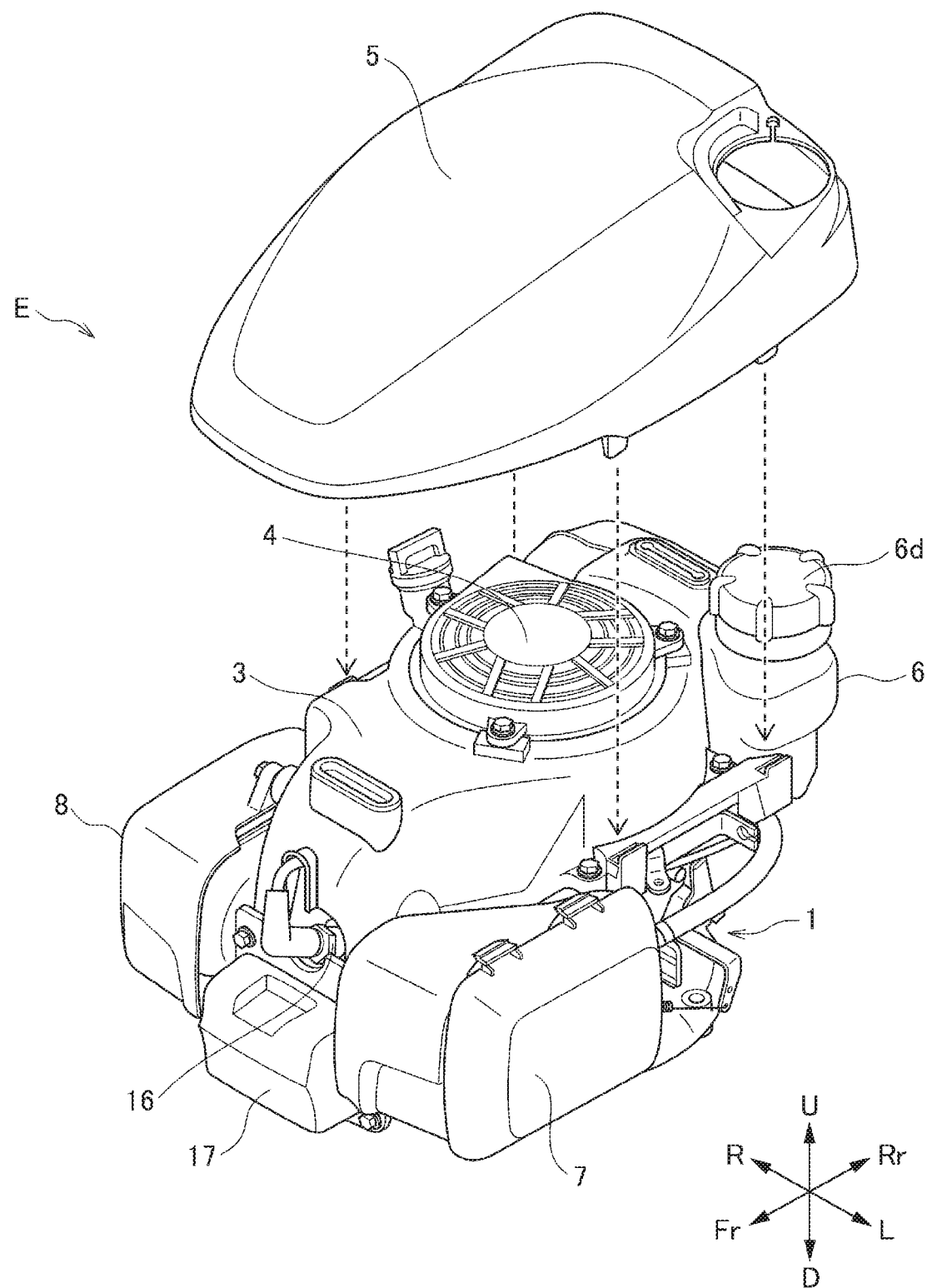
FIG. 2 is a perspective view of the engine with a top cover removed, as viewed from a front oblique upper side.

First, an embodiment of an engine of the present invention will be described with reference to FIGS. 1 to 5. An engine E according to the present embodiment is a small-sized general-purpose engine installed in a work machine M such as a walk-behind lawnmower and includes an OHV vertical engine as an engine body 1. For simplicity and clarity of description in the present specification, an axial direction of a crankshaft 11 is defined as an up-down direction, a direction which is perpendicular to the up-down direction and in which a piston 13 slides back and forth is defined as a front-rear direction (a second direction), and a direction perpendicular to the up-down direction and the front-rear direction is defined as a left-right direction (a first direction). In the drawings, the front, the rear, the left side, the right side, the upper side, and the lower side of the engine E or the work machine M are indicated as Fr, Rr, L, R, U, and D, respectively.

[Engine]

As illustrated in FIGS. 1 to 4, the engine E according to the present embodiment includes the engine body 1, a cooling fan 2 that is disposed above the engine body 1 and also serves as a flywheel, a fan cover 3 that accommodates the fan 2, a recoil starter 4 that is disposed above the fan 2 and performs a start operation of the engine body 1, a top cover 5 that covers at least an upper side of the engine body 1, the fan 2, the fan cover 3, and the recoil starter 4, a fuel tank 6 that stores fuel of the engine body 1, an air cleaner 7 that purifies the intake air of the engine body 1, and a muffler 8 that discharges exhaust gas of the engine body 1 while silencing the exhaust gas.

[Engine Body]

Figure 3:
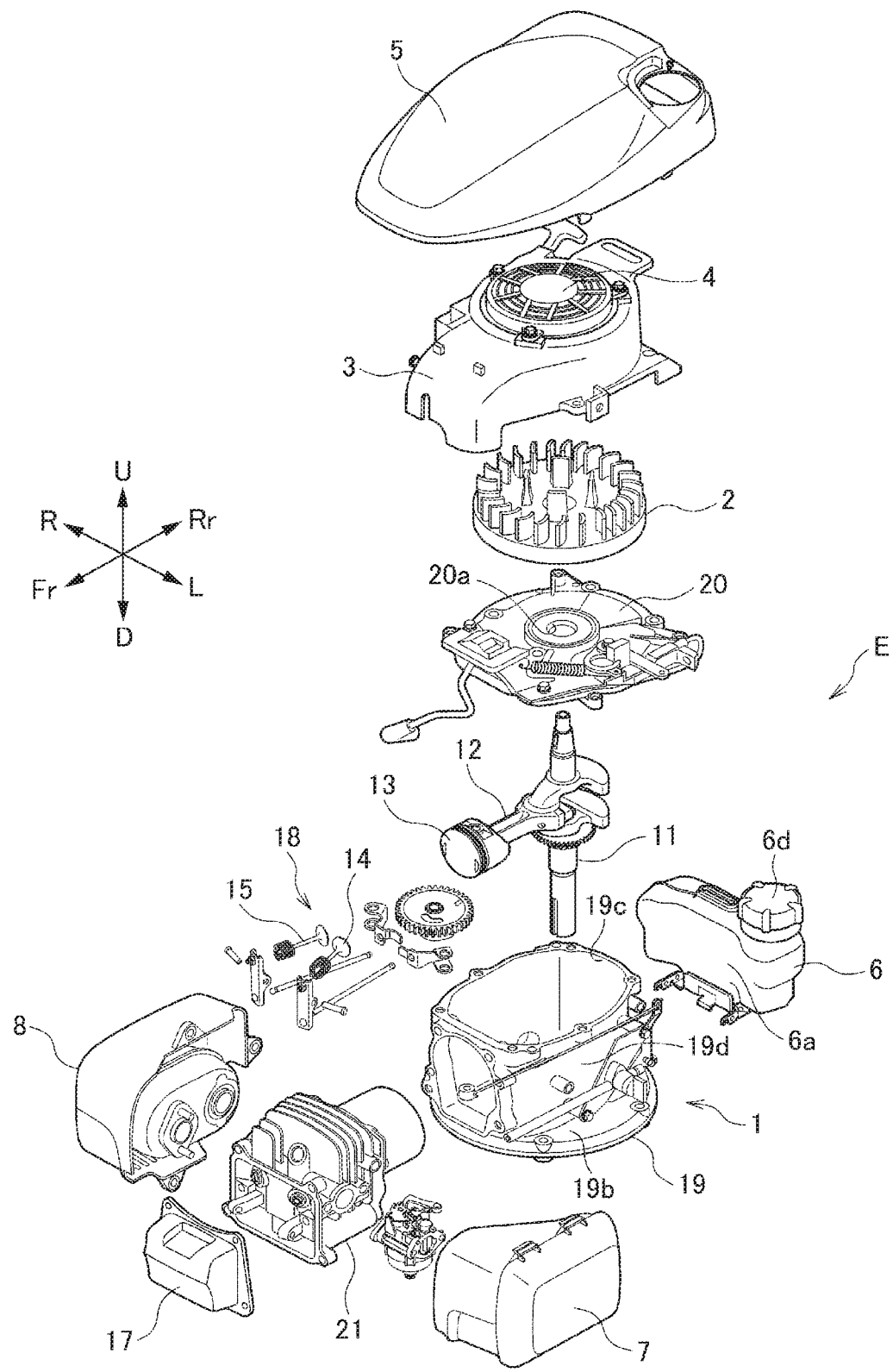
FIG. 3 is an exploded perspective view of the engine as viewed from the front oblique upper side.

As illustrated in FIGS. 1 and 3, the engine body 1 includes an engine block 10 including a crankcase part 10a and a cylinder part 10b, a crankshaft 11 that is rotatably supported by the crankcase part 10a toward the up-down direction, a piston 13 that is slidably fitted into the cylinder part 10b and is connected to the crankshaft 11 via a connecting rod 12, an intake valve 14, an exhaust valve 15, and a spark plug 16 which are provided on a head part 10c of the cylinder part 10b, a head cover 17 that covers the head part 10c of the cylinder part 10b, and a valve mechanism 18 that causes the intake valve 14 and the exhaust valve 15 to operate in accordance with the rotation of the crankshaft 11.

The engine block 10 according to the present embodiment is a three parts-divided structure including: a crankcase body 19 that includes a bottom portion 19b including a first crankshaft insertion hole 19a, and a tubular portion 19d that is formed integrally with the bottom portion 19b at a lower end portion and includes a case opening portion 19c at an upper end portion: a crankcase cover 20 that includes a second crankshaft insertion hole 20a and covers the case opening portion 19c of the crankcase body 19; and a cylinder unit 21 extending forward from the tubular portion 19d of the crankcase body 19. The crankcase body 19 and the crankcase cover 20 constitute the crankcase part 10a, and the cylinder unit 21 constitutes the cylinder part 10b. The structure of the engine block 10 is not limited to the example of the present embodiment and can be appropriately changed.

[Arrangement Configuration of Engine]

As illustrated in FIGS. 1 to 4, in the engine E, the air cleaner 7 and the muffler 8 are disposed on opposite sides in the left-right direction with the engine body 1 interposed therebetween. Specifically, the air cleaner 7 is disposed on the left side of the cylinder part 10b of the engine body 1, and the muffler 8 is disposed on the right side of the cylinder part 10b of the engine body 1.

The air cleaner 7 and the muffler 8 are disposed on a front side of the engine body 1 in the front-rear direction, and the fuel tank 6 is disposed on a rear side of the engine body 1 in the front-rear direction, which is a side opposite to the side on which the air cleaner 7 and the muffler 8 are disposed. Hereinafter, the fuel tank 6 that is a main part of the present invention will be described in detail with reference to FIGS. 1 to 5.

[Fuel Tank]

The fuel tank 6 includes a fuel tank body 6a longer in the left-right direction than in the front-rear direction when viewed from above, and an oil filler port 6b provided on an upper surface portion of the fuel tank body 6a. The oil filler port 6b is formed with a tubular portion 6c protruding upward from the upper surface portion of the fuel tank body 6a and is sealed by a cap 6d screwed to an outer peripheral surface of the tubular portion 6c. When fuel is supplied to the fuel tank 6, the cap 6d exposed from the top cover 5 is removed to open the oil filler port 6b, and then, the fuel is filled to the fuel tank 6 from the refueling tank (not illustrated) via the oil filler port 6b. In this case, the fuel tank 6 is disposed on a side opposite to the air cleaner 7 and the muffler 8 in the front-rear direction, so that the air cleaner 7 and the muffler 8 can be prevented from being the interference during the oil filling.

The oil filler port 6b of the fuel tank 6 is disposed at a position displaced leftward from a center portion in the left-right direction. According to the engine E, the worker stands on the left of the fuel tank 6 to perform oil filling, so that it is possible to prevent the fuel tank body 6a long in the left-right direction from being the interference. The oil filler port 6b of the fuel tank 6 is disposed at a position displaced leftward in the left-right direction in the present embodiment and may be disposed at a position displaced rightward from the center portion in the left-right direction. In this case, the worker stands on the right of the fuel tank 6 to perform the oil filling.

The muffler 8 is disposed on the right side, which is a side opposite to the oil filler port 6b, in the left-right direction, and the air cleaner 7 is disposed on the left side, which is the same side as the oil filler port 6b, in the left-right direction. According to the engine E, the oil filler port 6b of the fuel tank 6 is provided on an air cleaner 7 side whose temperature is lower than that of the muffler 8, so that the worker can perform oil filling in a comfortable environment.

[Level Gauge]

Figure 4:
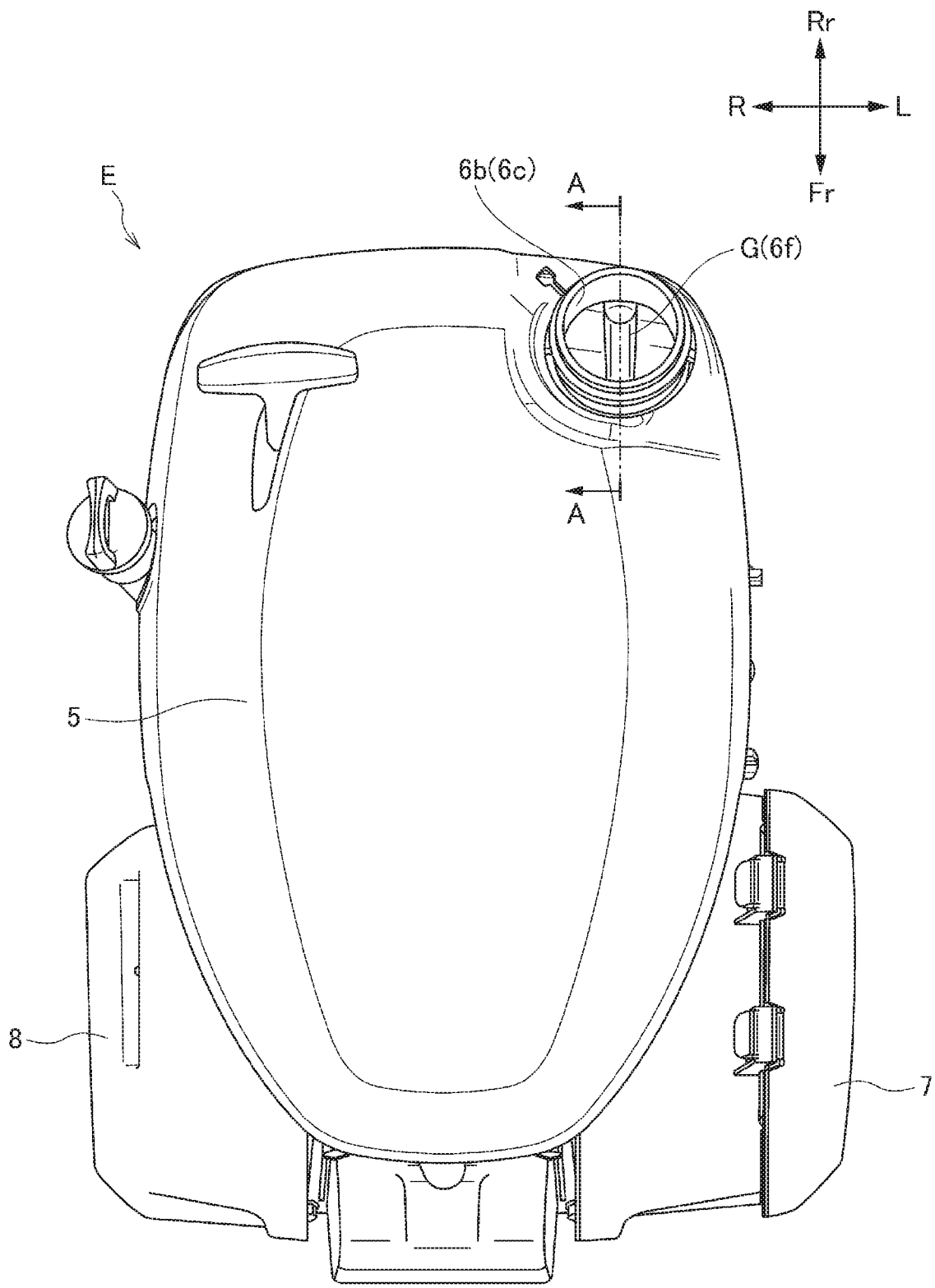
FIG. 4 is a plan view of the engine.
Figure 5:
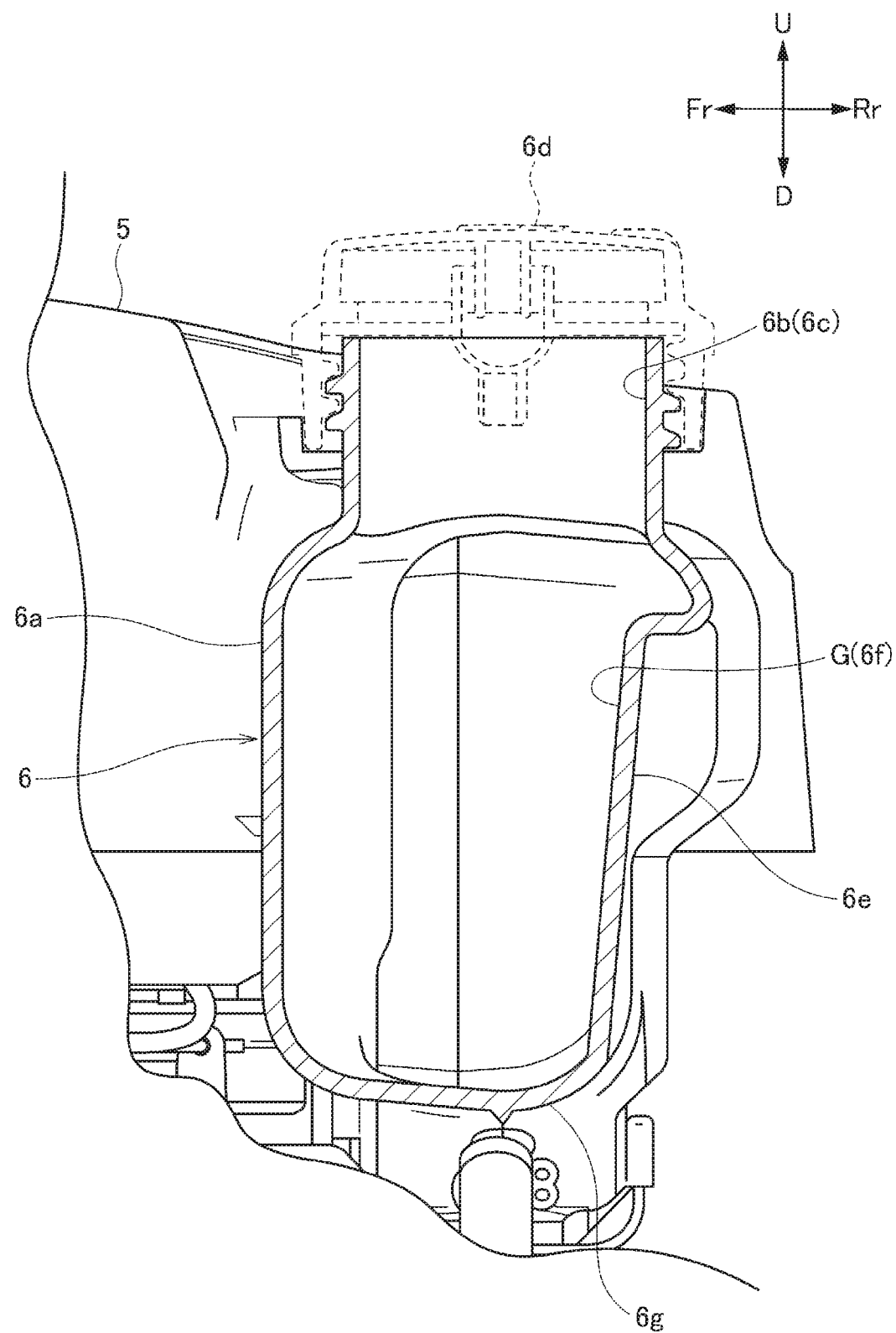
FIG. 5 is a sectional view taken along a line A-A of FIG. 4.

As illustrated in FIGS. 4 and 5, a level gauge G, by which a liquid level of the fuel filled to the fuel tank 6 can be visually recognized, is provided inside the fuel tank 6 to prevent the fuel from overflowing from the oil filler port 6b during the oil filling. The level gauge G according to the present embodiment is formed with a bulging portion 6f extending along the up-down direction, which is formed by causing a wall surface 6e of the fuel tank body 6a to bulge in a rib shape inside the fuel tank body 6a, and the bulging portion 6f changes the light reflection, so that the liquid level of the fuel can be easily visually recognized. The level gauge G is formed by causing the wall surface 6e of the fuel tank body 6a to bulge in a rib shape inside the fuel tank body 6a, so that the fuel tank 6 including the level gauge G can be easily produced. The level gauge G does not need to have a scale and may be one that reminds the worker that the fuel has been injected to reach a predetermined value, such as an oil-filling upper limit level.

The bulging portion 6f forming the level gauge G is continuously formed from a bottom surface 6g of the fuel tank body 6a to, for example, a position having the height of the oil-filling upper limit level. According to the level gauge G, not only a liquid level of fuel filled to the fuel tank 6 can be visually recognized at a stage where the amount of oil filling is small during the oil filling to the fuel tank 6, but also the fuel can be prevented from overflowing from the oil filler port 6b of the fuel tank 6 during the oil filling since the oil-filling upper limit level can be easily recognized.

The bulging portion 6f forming the level gauge G is provided at a position where the level gauge G can be visually recognized when the cap 6d is removed and the oil filler port 6b is viewed from above and from the front side in the front-rear direction. Specifically, on the wall surface 6e forming a rear surface of the fuel tank body 6a, the bulging portion 6f is formed at a part positioned rearward than the oil filler port 6b. According to the level gauge G, when the worker stands on the left of the engine E during the oil filling and the oil filler port 6b is viewed from above and from the front side in the front-rear direction, that is, when the worker stands at a correct position during the oil filling and the oil filler port 6b is peered at from above, the level gauge G can be recognized. Accordingly, the fuel can be more reliably prevented from overflowing from the oil filler port 6b of the fuel tank 6 during the oil filling.

When the worker stands at a wrong position and performs the oil filling, that is, when the worker performs the oil filling from the right side in the left-right direction, the filled fuel may hit the wall surface 6e and scatter since the wall surface 6e forming the left side surface of the fuel tank 6 is close to the oil filler port 6b. In this case, since the worker is far from the oil filler port 6b and is difficult to check the level gauge G, it is possible to notice that the worker performs oil filling from a wrong position.

[Work Machine]

Next, the work machine M equipped with the above-described engine E will be described with reference to FIGS. 6 and 7.

Figure 6:
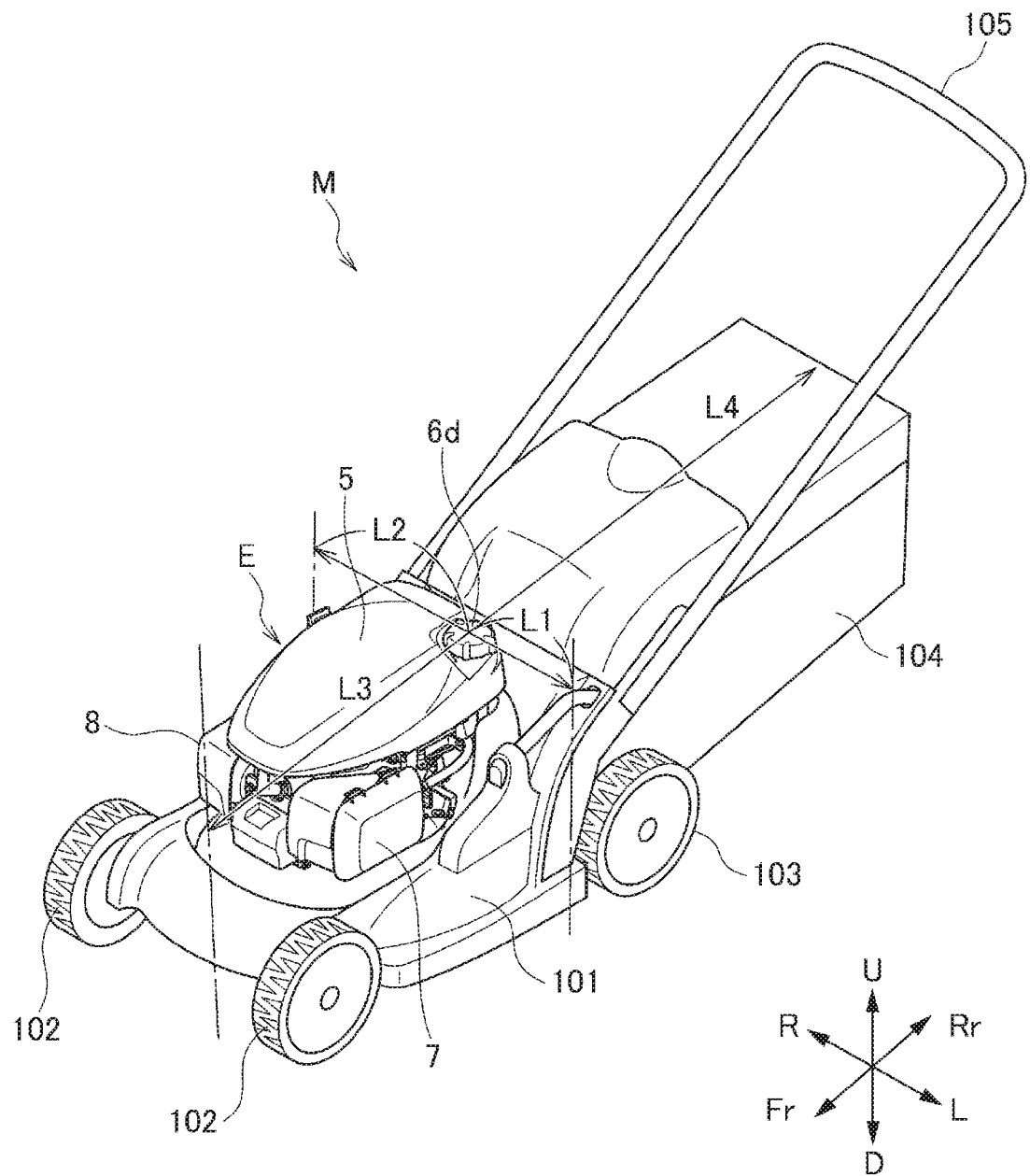
FIG. 6 is a perspective view of a work machine according to an embodiment of the present invention, as viewed from the front oblique upper side.
Figure 7:
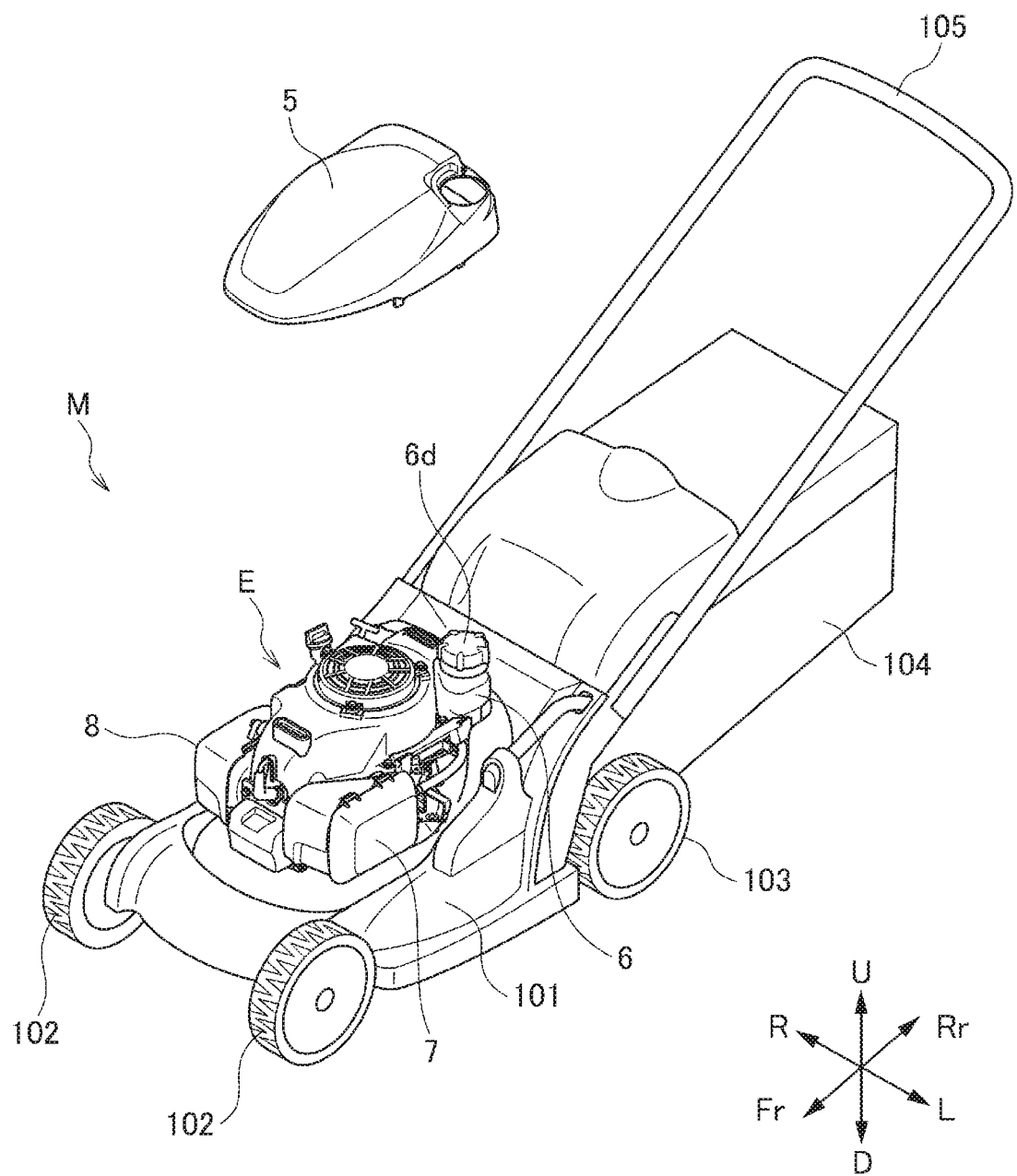
FIG. 7 is a perspective view of the work machine with a top cover removed, as viewed from the front oblique upper side.

As illustrated in FIGS. 6 and 7, the work machine M according to the present embodiment is a walk-behind lawnmower and includes a lawnmower body 101 equipped with the engine E, front wheels 102 and rear wheels 103 which support the lawnmower body 101 in a travelable manner, a blade (not illustrated) that is disposed at a bottom portion of the lawnmower body 101 and is rotationally driven by the engine E, a grass bag 104 that is detachably mounted on a rear portion of the lawnmower body 101 and accommodates the grass mowed by the blade, and a handle portion 105 that extends rearward and upward from the rear portion of the lawnmower body 101 and is to be handled by the worker. The worker handles a rear end portion of the handle portion 105 and performs lawn mowing work while pushing the lawnmower body 101 forward.

In the work machine M according to the present embodiment, a distance L1 from the oil filler port 6b of the fuel tank 6 to a left end portion of the lawnmower body 101 in the left-right direction is shorter than any distance of a distance L2 from the oil filler port 6b of the fuel tank 6 to a right end portion of the lawnmower body 101 in the left-right direction, a distance L3 from the oil filler port 6b of the fuel tank 6 to a front end portion of the lawnmower body 101 in the front-rear direction, and a distance L4 from the oil filler port 6b of the fuel tank 6 to a rear end portion of the handle portion 105 or the grass bag 104 in the front-rear direction. According to the work machine M, when filling fuel to the fuel tank 6 of the work machine M, the worker stands beside the left end portion of the lawnmower body 101, which has the shortest distance from the oil filler port 6b of the fuel tank 6, and on which the handle portion 105 and the grass bag 104 which are the interference of the work are not provided, to perform the oil filling. Accordingly, the worker can fill fuel to the fuel tank 6 easily while checking the level gauge G.

The above-described embodiment can be appropriately modified, improved, or the like. For example, the engine E according to the present invention is applied to a walk-behind lawnmower in the above-described embodiment, and the engine E according to the present invention can be applied to a work machine other than a walk-behind lawnmower, such as a high-pressure washing machine, a generator, a snowblower, a cultivator, and a mower.

At least the following matters are described in the present specification. Although the corresponding constituent elements or the like in the above-described embodiments are shown in parentheses, the present invention is not limited thereto.

(1) An engine (an engine E) includes:
an engine body (an engine body 1);
a fuel tank (a fuel tank 6):
an air cleaner (an air cleaner 7); and
a muffler (a muffler 8),
in which the air cleaner and the muffler are disposed on opposite sides in a first direction (a left-right direction) with the engine body interposed therebetween,
the air cleaner and the muffler are disposed on one side (a front side) of the engine body in a second direction (a front-rear direction) perpendicular to the first direction,
the fuel tank is longer in the first direction than in the second direction when viewed from above, and is disposed on the other side (a rear side) of the engine body in the second direction,
the fuel tank is provided with an oil filler port (an oil filler port 6b) to be sealed with a cap (a cap 6d) at a position displaced to one side (a left side) in the first direction, and
a level gauge (a level gauge G), which can be visually recognized when the cap is removed and the oil filler port is viewed from above and from the one side in the second direction, is provided inside the fuel tank.

According to (1), the fuel tank is disposed on the side opposite to the fuel tank and the muffler in the second direction (the front-rear direction), so that the air cleaner and the muffler can be prevented from being the interference during the oil filling. The oil filler port of the fuel tank is disposed at a position displaced to one side (the left side) in the first direction (the left-right direction), so that the fuel tank itself that is long in the first direction (the left-right direction) can be prevented from being the interference when the worker stands beside the one side (the left side) in the first direction (the left-right direction) to perform the oil filling.

The level gauge, which can be visually recognized when the cap is removed and the oil filler port is viewed from above and from the one side (the front side) in the second direction (the front-rear direction), is provided inside the fuel tank. Accordingly, when the worker stands beside the one side (the left side) in the first direction (the left-right direction), and the oil filler port is viewed from above and from the one side (the front side) in the second direction (the front-rear direction), that is, when the worker stands at a correct position and the oil filler port is peered at from above, the level gauge can be recognized, and the fuel can be prevented from overflowing from the fuel tank during the oil filling.

When the worker performs the oil filling from a wrong position, that is, performs the oil filling from the other side (the right side) in the first direction (the left-right direction), a wall surface (a left wall surface) of the fuel tank is close to the oil filler port. Accordingly, the fuel may hit the wall surface and scatter. However, in this case, since the worker is far from the oil filler port and is difficult to check the level gauge, it is possible to notice that the worker performs the oil filling from a wrong position.

(2) In the engine according to (1),
the level gauge is formed by causing a wall surface of the fuel tank to bulge inside the fuel tank.

According to (2), the level gauge is formed by causing the wall surface of the fuel tank to bulge inside the fuel tank, so that the fuel tank can be easily produced.

(3) In the engine according to (1) or (2),
the muffler is disposed on the other side in the first direction, and
the air cleaner is disposed on the one side in the first direction.

According to (3), the oil filler port of the fuel tank is provided on the air cleaner side whose temperature is lower than that of the muffler, so that the user can perform the oil filling in a comfortable environment.

(4) In the engine according to any one of (1) to (3), the level gauge is continuously provided from a bottom surface of the fuel tank.

According to (4), the level gauge is continuously provided from the bottom surface of the fuel tank, so that the fuel can be more reliably prevented from overflowing from the fuel tank.

(5) Provided is a work machine equipped with the engine according to any one of (1) to (4),
in which a distance (a distance L1) from the oil filler port of the fuel tank to an end portion on one side in the first direction (a left end portion) is shorter than any distance of a distance (a distance L2) from the oil filler port of the fuel tank to an end portion on the other side in the first direction (a right end portion), a distance (a distance L3) from the oil filler port of the fuel tank to an end portion on one side in the second direction (a front end portion), and a distance (a distance L4) from the oil filler port of the fuel tank to an end portion on the other side in the second direction (a rear end portion).

According to (5), when filling the fuel to the work machine, the worker stands beside the end portion on the one side in the first direction, which has the shortest distance from the oil filler port of the fuel tank, to perform the oil filling. Accordingly, the worker can fill fuel to the fuel tank easily while checking the level gauge, and the fuel can be prevented from overflowing from the fuel tank during the oil filling.

(6) Provided is a work machine equipped with the engine according to any one of (1) to (4),
in which a distance (a distance L1) from the oil filler port of the fuel tank to an end portion on one side in the first direction (a left end portion) is shorter than a distance (a distance L2) from the oil filler port of the fuel tank to an end portion on the other side in the first direction (a right end portion), and a distance (a distance L3) from the oil filler port of the fuel tank to an end portion on one side in the second direction (a front end portion), and
a handle portion (a handle portion 105) of the work machine is provided on the other side in the second direction relative to the oil filler port of the fuel tank.

According to (6), when filling the fuel to the work machine, the worker stands beside the end portion on the one side in the first direction, which has a short distance from the oil filler port of the fuel tank, and on which the handle portion that is the interference of the work is not provided, to perform oil filling. Accordingly, the worker can fill fuel to the fuel tank easily while checking the level gauge, and the fuel can be prevented from overflowing from the fuel tank during the oil filling.

REFERENCE SIGNS LIST

1 Engine body
6 Fuel tank
6b Oil filler port
6d Cap
7 Air cleaner
8 Muffler
105 Handle portion
E Engine
G Level gauge
M Work machine
L1 Distance from oil filler port to left end portion
L2 Distance from oil filler port to right end portion
L3 Distance from oil filler port to front end portion
L4 Distance from oil filler port to rear end portion

The invention claimed is:
1. An engine comprising:
an engine body;
a fuel tank;
an air cleaner; and
a muffler,
wherein the air cleaner and the muffler are disposed on opposite sides in a first direction with the engine body interposed therebetween,
the air cleaner and the muffler are disposed on one side of the engine body in a second direction perpendicular to the first direction,
the fuel tank is longer in the first direction than in the second direction when viewed from above, and is disposed on the other side of the engine body in the second direction,
the fuel tank is provided with an oil filler port to be sealed with a cap at a position displaced to one side in the first direction, and
a level gauge, which is visually recognized when the cap is removed and the oil filler port is viewed from above and from the one side in the second direction and which is not visually recognized when the cap is removed and the oil filler port is viewed from above and from the other side in the second direction, is provided inside the fuel tank.

2. The engine according to claim 1,
wherein the level gauge is formed by causing a wall surface of the fuel tank to bulge inside the fuel tank.

3. The engine according to claim 1,
wherein the muffler is disposed on the other side in the first direction, and
the air cleaner is disposed on the one side in the first direction.

4. The engine according to claim 1,
wherein the level gauge is continuously provided from a bottom surface of the fuel tank.

5. A work machine comprising the engine according to claim 1,
wherein a distance from the oil filler port of the fuel tank to an end portion on one side in the first direction is shorter than any distance of a distance from the oil filler port of the fuel tank to an end portion on the other side in the first direction, a distance from the oil filler port of the fuel tank to an end portion on one side in the second direction, and a distance from the oil filler port of the fuel tank to an end portion on the other side in the second direction.

6. A work machine comprising the engine according to claim 1,
wherein a distance from the oil filler port of the fuel tank to an end portion on one side in the first direction is shorter than a distance from the oil filler port of the fuel tank to an end portion on the other side in the first direction, and a distance from the oil filler port of the fuel tank to an end portion on one side in the second direction, and a handle portion of the work machine is provided on the other side of the oil filler port of the fuel tank in the second direction.

\* \* \* \* \*